United States Patent
Cirri et al.

(10) Patent No.: US 7,322,099 B2
(45) Date of Patent: Jan. 29, 2008

(54) METHOD FOR PRODUCING HEATED COMPONENTS FOR INJECTION MOULDING APPARATUS

(75) Inventors: Gianfranco Cirri, Florence (IT); Maria Prudenziati, Modena (IT)

(73) Assignee: Inglass S.p.A., San Polo di Piave (Treviso) (IT)

( * ) Notice: Subject to any disclaimer, the term of this patent is extended or adjusted under 35 U.S.C. 154(b) by 463 days.

(21) Appl. No.: 11/113,845

(22) Filed: Apr. 25, 2005

(65) Prior Publication Data

US 2005/0257367 A1 Nov. 24, 2005

(30) Foreign Application Priority Data

Apr. 23, 2004 (IT) .......................... TO2004A0253

(51) Int. Cl.
*H01C 17/06* (2006.01)

(52) U.S. Cl. .......................... 29/620; 29/611; 29/612; 29/613; 29/623.5; 29/890.142; 219/121.47; 219/543; 219/548; 427/34; 427/451

(58) Field of Classification Search ................. 29/620, 29/611–613, 623.5, 890.142; 219/121.47, 219/543, 548; 427/34, 451
See application file for complete search history.

(56) References Cited

U.S. PATENT DOCUMENTS

| | | | |
|---|---|---|---|
| 5,665,262 A * | 9/1997 | Hajaligol et al. | 219/553 |
| 6,433,319 B1 * | 8/2002 | Bullock et al. | 219/543 |
| 6,596,960 B1 * | 7/2003 | Brook-Levinson et al. | 219/121.47 |

* cited by examiner

*Primary Examiner*—A. Dexter Tugbang
*Assistant Examiner*—Tim Phan
(74) *Attorney, Agent, or Firm*—Heslin Rothenberg Farley & Mesiti P.C.; Victor A. Cardona, Esq.

(57) ABSTRACT

A method for producing components for injection moulding comprising a body made of thermally conducting material with expansion coefficient matching that of the insulating layers and provided with a passage for the material to be injected. At least one strip of electrically conducting material with high change of resistance with temperature, forming a heating resistor or inductor is applied on a electrically insulating base layer previously directly applied on the body. At least one final insulating layer with low thermal emissivity is then applied to optimise electrical efficiency. The method utilises thermal spray techniques and can be applied also for production of other heating equipment.

20 Claims, 4 Drawing Sheets

METHOD FOR PRODUCING HEATED COMPONENTS FOR INJECTION MOULDING APPARATUS

CROSS REFERENCE TO RELATED APPLICATIONS

This application claims priority from Italian Patent Application No. TO2004A000253, filed Apr. 23, 2004, the entire disclosure of which is incorporated herein by reference.

FIELD OF THE INVENTION

The present invention relates to a method and processes of producing components for injection moulding apparatus.

The present invention was developed with specific reference to the production of heated components for injection moulding apparatus including a body made of thermally conducting material provided with at least one conduit for the passage of material to be injected and at least one heating electrical resistor applied directly on the body to reach temperatures up to 500° C.

Other components for injection moulding equipment comprising a body made of thermally conductor material wherein a heating resistor is applied are, for example, hot chambers, heating plates, injection nozzles (as generally described in the documents U.S. Pat. No. 6,609,902, U.S. Pat. No. 6,555,044 and US-2003/0003188) and hot channels in general. Other components whereto the invention also finds application can include accessories of injection moulding apparatus such as coils, plates and the like applicable for example to hot chambers in superficial heat transmitting contact. In addition the method can find application in any other heating equipments.

The term "heating resistor" is intended to designate, in the following specification and claims, a resistive element designed to produce heat both resistively (i.e. traditionally operating based on the Joule effect) and inductively. Induction heating devices (inductors) are disclosed, for instance, in U.S. Pat. No. 6,717,118 and U.S. Pat. No. 6,781,100.

STATE OF THE PRIOR ART

Currently, runner nozzle are typically heated by a heat source external to the nozzle. The heat source is usually at least one resistive wire spirally wound and coaxially disposed about the external surface of the runner nozzle. The resistive wire is enclosed in a metal sheath provided with an insulating coating and placed on grooves machined in the outer surface of the body. An example of these traditional solutions is described in European Patent EP-B-0750975 and in US-2002/0160075, which illustrates a nozzle for injection moulding of plastic materials comprising a generically cylindrical body having a spiral-shaped groove on its external surface, in which a first and a second heating resistor are inserted. A temperature controlling thermocouple is operatively associated to each heating resistor. However this type of heater operates inefficiently because of its small capability to transfer heat energy while developing high temperature difference. Moreover this heater configuration requires a larger diameter of the nozzle than that would be enough for the mechanical strength of the system.

In order to produce more efficient heating systems some strategies have been proposed either for runner nozzle or other applications. For example document U.S. Pat. No. 6,596,960 discloses a method for the production of heating elements on pipelines for hot air and water (<100° C.) and similar household or industrial applications, using at least one of the so-called "Plasma Spray" and flame spray technologies. On the body of the pipeline a layer of an electrically insulating material, such as alumina is applied first, and then the heating element is applied, spraying particles of a metallic alloy, including boron, on the insulating layer thereby formed. The deposition of the metallic alloy, according to a predetermined path, is performed—like the deposition of alumina—by means of Plasma Spray. Briefly, plasma spray is one of a myriad of processes generally included in the term "Thermal Spray". In the following description and claims the term "Thermal Spray" will be used to include one, and the one most appropriate for the specific scope in discussion, among several process briefly described below.

Thermal spray is a versatile technology for depositing coatings of both metals and ceramics. Systems that use powder as feedstock include for example arc plasma, flame spray, and high velocity oxy-fuel (HVOF) systems, Cold Spray, whereas systems that use wire as feedstock include for example arc wire, HVOF wire, and flame spray systems. Thermal Spray uses thermal energy generated by chemical (combustion) or electrical (plasma or arc) methods to melt, or soften, and accelerate fine dispersions of particles or droplets to speeds in the range of 50 to >1000 m/s. The high particle temperatures and speeds achieved results in significant droplet deformation or impact on a surface, producing layers made of "splats" that conform and adhere to the substrate surface.

In "arc plasma" spraying a DC electric arc creates an ionized gas (a plasma) that is used to spray molten powdered materials in a manner similar to spraying paint.

"Arc wire spray" systems function by melting the tips of two wires (e.g., zinc, copper, aluminium, or other metal) and transporting the resulting molten droplets by means of a carrier gas (e.g., compressed air) to the surface to be coated. The wire feedstock is melted by an electric arc generated by a potential difference between the two wires.

In "flame spray" a wire or powder feedstock is melted by means of a combustion flame, usually effected through ignition of gas mixtures of oxygen and another gas (e.g., acetylene).

"HVOF" uses a fuel gas (such as propane, hydrogen or propylene) and oxygen to create a combustion jet at very high temperatures (e.g. 2500 to 3000° C.). the combustion takes place internally in at very high pressure in a small chamber (a torch), exiting trough a small-diameter barrel to generate a supersonic gas jet with very high particle speeds. This hot, high speed gas is used to both melt a feedstock (e.g., wire, powder, or combination thereof) and transport the molten droplets to the surface of a substrate at speeds in the range of 330-1000 m/sec. Compressed gas (e.g., compressed air) is used to further accelerate the droplets and cool the HVOF apparatus.

"Cold spray" is a process in which coatings are applied by accelerating powdered feedstock of ductile metals to speeds of 300 to 1200 m/s using gas dynamic techniques with nitrogen or helium. The process is commonly referred to as "cold gas-dynamic spraying" because of the relatively low temperatures (0 to 800° C.) of the expanded gas and particle stream that emanates from the nozzle.

A close control of sprayed materials properties can be achieved by the use of low-pressure or even in vacuum chambers, while fine patterns can be obtained using masks or focused beams and robotized systems. One of the major advantages of thermal spray processes is their ability to apply coatings to substrates without significant heat input and therefore also refractory materials can be applied to machined, fully heat-treated parts without changing the properties of the part and without excessive thermal distortion of the part. In fact, on impact on the substrate, solidified droplets cool very rapidly (e.g. at rates >$10^6$ K/s for metals). Another feature of thermal sprayed materials is their porosity, typically from 1% to 5% depending of the spray process, particle speed and size distribution, and spray distance. Porosity may be beneficial in tribological applications and in thermal barrier coatings but, on the contrary, may adversely affect the dielectric properties of an insulating coating.

Examples of application of the Plasma Spray techniques to heater devices are described in the documents U.S. Pat. No. 5,408,070, U.S. Pat. No. 5,420,395, U.S. Pat. No. 5,616,263 which teach methods for the production of copying and printing machines. Moreover, the document U.S. Pat. No. 6,575,729 describes how to place heat-conducting bands inside or on the outer surface to hot chambers and nozzles for injection moulding of low-temperature melting plastic materials.

This prior art, however, is not in practice usable in itself in the applications provided for the present invention, essentially because it not allows sufficient reliability or proper operation for systems whose working temperature has to reach values up to 500° C. Moreover, the prior art gives rise to problems connected to hot corrosion, corrosion in wet environments and salt fog, risk of cracks and excessive porosities in the dielectric layers with consequent failures of the heating resistors, as well as difficulties in obtaining reliable electrical connections.

SUMMARY OF THE INVENTION

The object of the present invention is to provide a simple and cost effective method for applying heating resistors to components for injection moulding apparatus, and in general for heating equipment, by "Thermal Spray" technology.

An additional object of the invention is to allow the production of heating resistors directly on components for injection moulding apparatus to operate at temperatures up to 500° C., by means of the use, one of the Thermal Spray technologies, i.e. the most appropriate according to the material to be sprayed, resulting in improved reliability and greater efficiency in terms of reduced mass and energy consumption.

Another object of the invention is to do without thermocouples for the control of the heaters by means of heating materials with large temperature coefficient of resistance, resulting in simpler layout for the related electrical circuits with improved reliability.

A further reduction of energy losses is achieved with a dielectric layer deposited on the heater, and having low emissivity for infrared radiation in such a way to take the dispersion of thermal energy at the minimum level.

According to the present invention, these objects are achieved with a method and processes having the characteristics set out in claim 1. Additional secondary characteristics are defined in the subordinated claims.

BRIEF DESCRIPTION OF THE DRAWINGS

The characteristics and the advantages of the method according to the present invention shall become readily apparent in the detailed description that follows, provided purely by way of non limiting example, with reference to the accompanying drawings, in which.

DETAILED DESCRIPTION OF THE INVENTION

Figure 1:
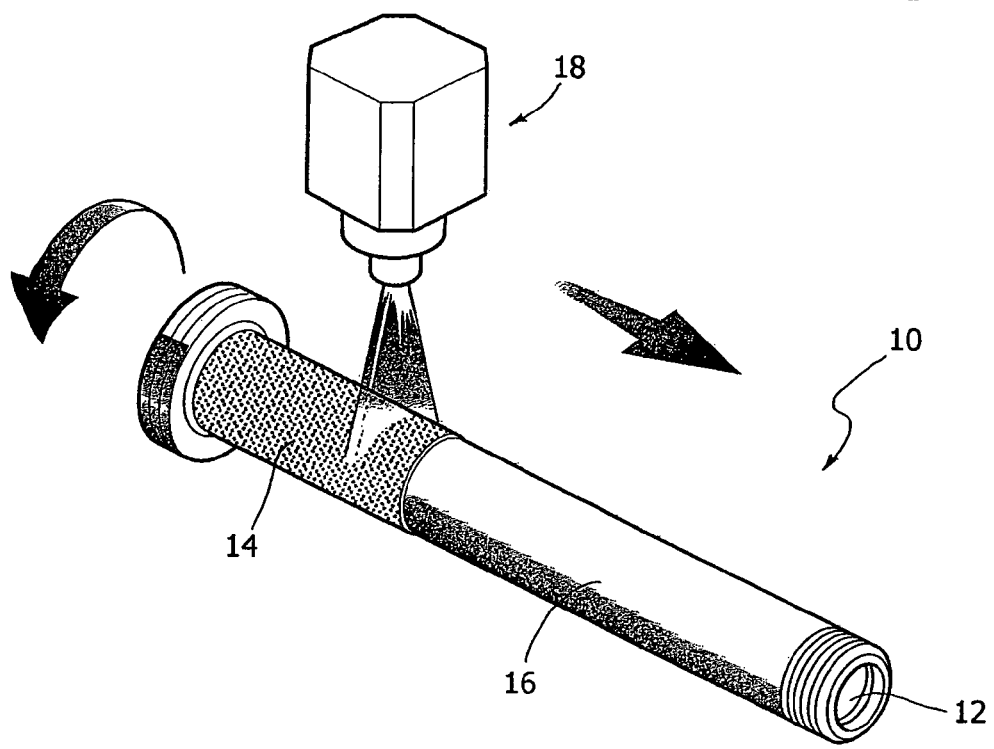
FIGS. 1 through 3 are schematic perspective views illustrating some steps of the method according to the present invention.
Figure 2:
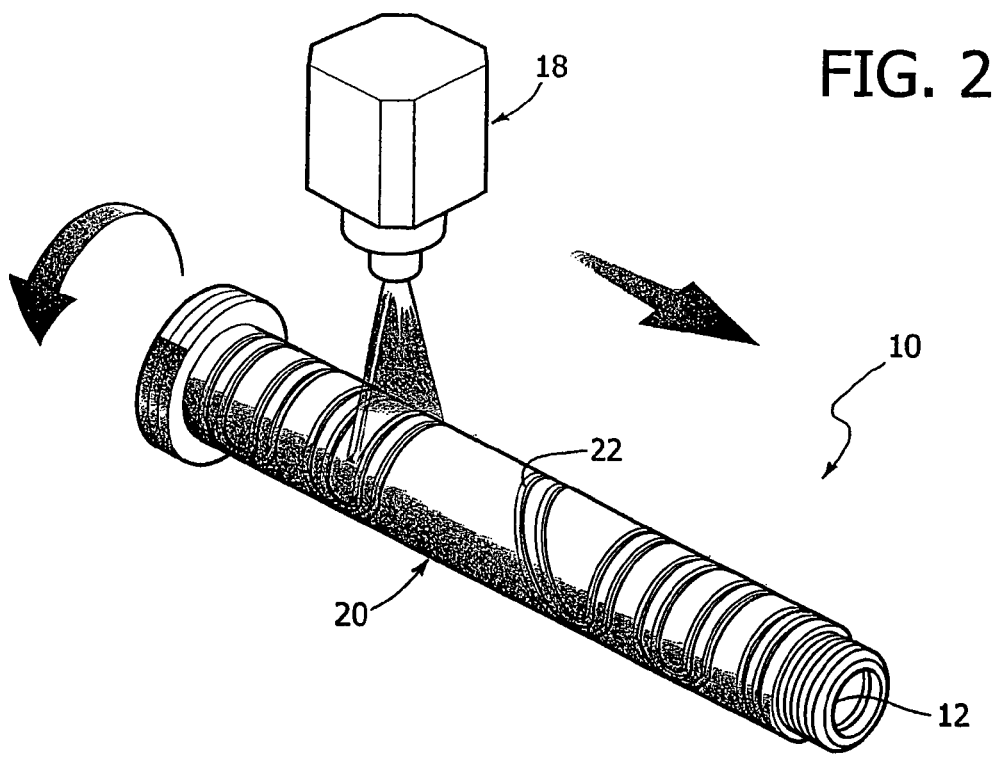
Figure 3:
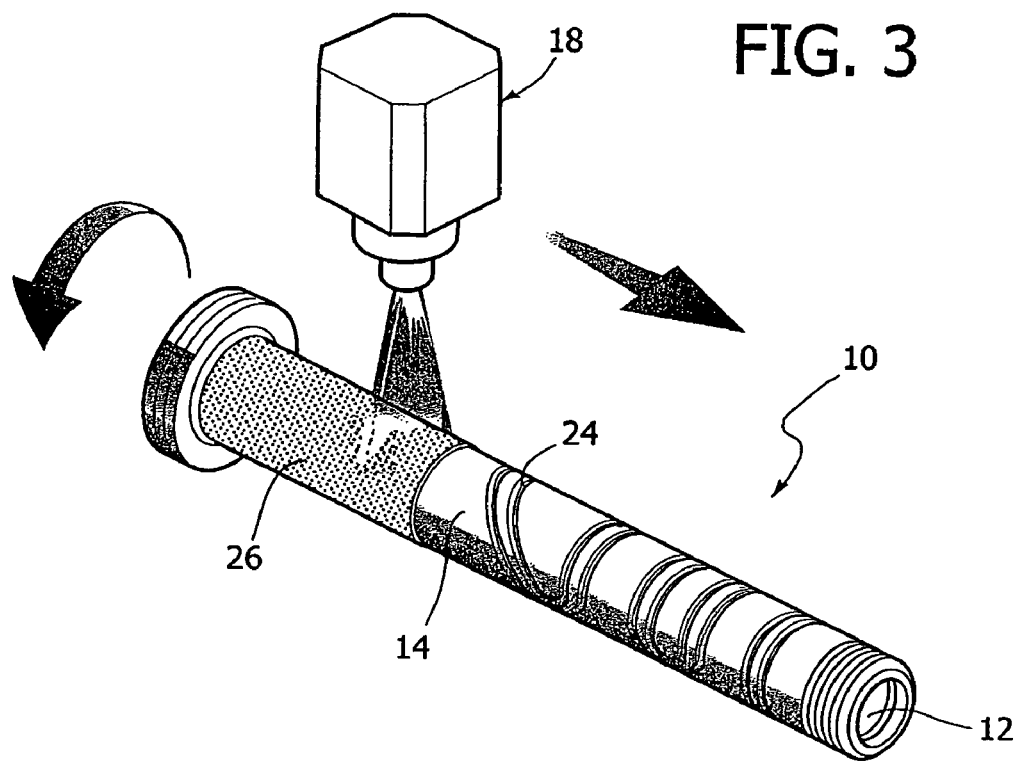
Figure 4:
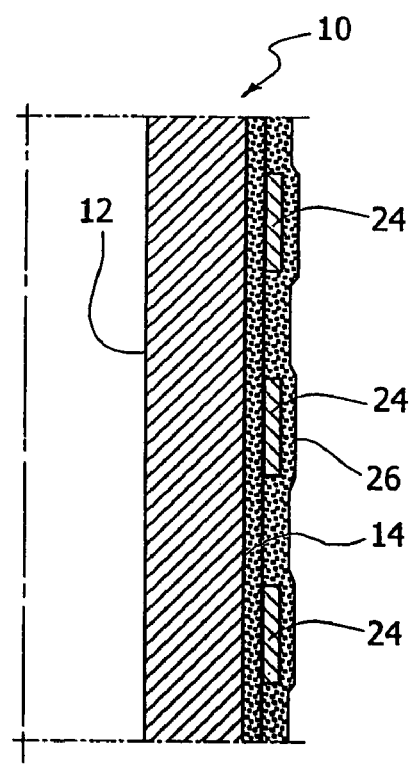
FIG. 4 is a schematic section showing a part of a component for injection moulding apparatus at the end of the processes envisaged for the method according to the invention.

With reference to FIGS. 1 through 3, the sequence of processes used for implementing the method shall now be described for a heating element on the outer surface of a cylindrical body 10 provided with a channel 12 for the passage of material to be injected.

In this example, the body 10 is machined to have a core with a passageway formed therein for the communication of the flowable material such as in a nozzle for injection moulding of plastic materials. However, it is to be understood that the described method is by no means limited to circular cylinders or tubes but it can be extended for the production to any other component with other shapes with special interest to other components of an injection moulding system where heaters are required such as hot chambers, heating plates, injection nozzles, extensions and hot channels of various kinds as well as to the related electrical connections. In addition, experts can conceive application of the same method for the realization of other heating equipment.

The method according to the present invention is essentially based on the use of one or more spraying techniques for making one or more heaters in direct contact with the external surface of the body to serve as a component of an apparatus for injection moulding. Therefore the heater is an integral part of the structure to be heated, with no need for grooves in which shielded heaters have to be inserted. This strategy enables the construction of heated parts having lower mass, lower wall thickness and smaller surface area, resulting in heated components with more efficient power efficiency either in terms of power to be supplied for reaching the required high temperature and in terms of rate of heating. In fact, the minimum time $t_{min}$ to heat up a particular article is governed by $t_{min}=(CM\Delta T)/P$ where C is the specific heat of the article, M is the mass of the article, $\Delta T$ is the change in temperature desired and P the electrical power supplied to the heater. It has been verified that this strategy results in power consumption and heating time 50% lower those observed in nozzle of the current technology.

In the preferred embodiment of this invention, the body 10 is made from a thermally conductive metal, preferably an alloy with a controlled thermal coefficient of expansion (TCE) and specifically a value of TCE such as to guarantee a small mismatch between the body and the layers after applied thereon; this very small mismatch is an essential prerequisite to avoid cracks or other defects which otherwise will develop in the wide temperature excursions experienced by the body in operation, i.e. during the heating and cooling cycles from room temperature up to several hundred degrees Centigrade, demanded by the application.

Figure 6:
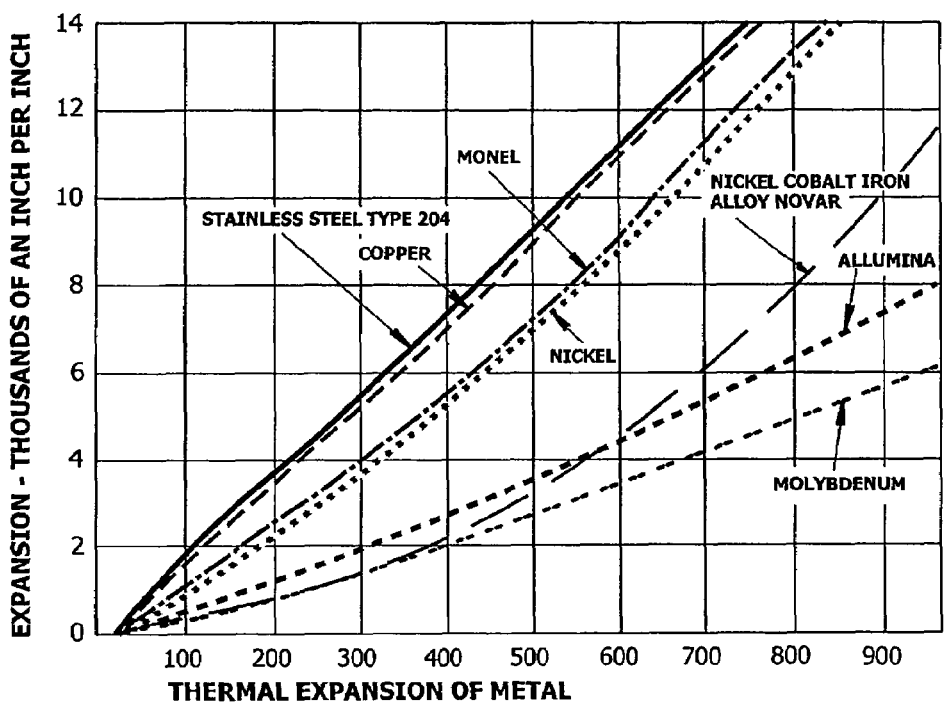
FIG. 6 is a diagram showing the relative change in linear dimension due to change in temperature for different materials.

The term "alloy" means, in the present context, Fe—Ni, Fe—Ni—Cr, Fe—Ni—Co based alloys, as well as various steels (denoted for example by the commercial names "Vacovit", "Vacon", "Kovar", "Dilver", "Nilo", "Novar", "AISI 446" (registered trademarks) etc.) having TCE values close to those of dielectric materials such as glasses and ceramics, on the temperature range mentioned above, as shown in the diagram of FIG. 6.

The steps enabling the implementation of the method according to the invention are set forth in the following:

1) conditioning of the external surface of the body, with processes such as machining, degreasing, sand blasting, pickling, chemical, galvanic, brazing and annnealing treatments so as to improve the characteristics of the surface in terms of behaviour toward corrosion (MIL salt fog for iron), and ameliorate the matching of expansion coefficient between the body and the later layers deposited with thermal spray.

2) deposition of a bond-coat layer with a spray technology, having a controlled thickness (not visible in the drawings), and consisting in Ni, CoNi, NiCr, NiAl, CoNiCr, CoMoCr, NiCrAlY or similar materials well known to the experts in the field of thermal spray techniques. The mentioned bond coat has a dual purpose. The first purpose is to increase the corrosion resistance which otherwise will be apparent on the after deposited layers due to oxidation of iron-bearing metal alloys of the body 10 and percolation of iron-oxides through the porosity of the sprayed dielectric layer; this corrosion is particularly evident after exposure to humid and/or salty environments and it results in deterioration of dielectric properties, especially resistance and dielectric strength, of the insulating layer and—as a consequence—the electrical performance of the heating resistor. The second purpose of the bond coat is to further decrease the possible mismatch in thermal expansion coefficients between the body 10 and the after sprayed insulating layers.

3) Thermal spray deposition of the insulating layer 14 on the external surface 16 of the body 10 maintained at controlled values of temperature and pressure. The insulating material can be, for example, the product marketed with the name Metco 105SF by Sulzer Metco, which essentially consists of $Al_2O_3$. Other chances are to take the insulating material among other oxides, such as $ZrO_2$ or $Al_2O_3+TiO_2$ or spinels such as $MgAl_2O_4$ or others. The insulating layer 14 is sprayed by means of a spraying head 18. In the case of a body with cylindrical symmetry, during the spraying process a movement of rotation is imparted to the body 10 around its own axis and, at the same time, a movement of translation of the spraying outlet nozzle of the torch (also designated as the head) 18 relative to the body 10 in a direction parallel to the axis of rotation of the body, as indicated by the arrows. The torch will scan the target area at a constant rate.

The thickness of the layer 14 is usually in the range from 100 to 150 microns and it is chosen in order to provide electrical insulation from ground at the temperature and voltage at which the part will be used.

4) In order to obtain on body 10, now electrically insulated with the layer 14, the designed value for the heating resistor, a mask 20 is applied on the body 10. The mask 20 adheres to the layer 14 and it has at least one through groove 22 which extends according to a predetermined pattern. The pattern may have various shapes, for example linear, spiral or meander-like. The design is chosen in such a way that the heating resistor will transfer different heat fractions to the regions which have to receive more or less heat. After positioning the mask 20, a layer of electrically conducting material is deposited by a thermal spray technique. Also in this case a rotary motion is imparted to the body 10 around its own axis and a translation is imparted between the spraying head 18 and the body 10 in a direction parallel to the axis of rotation. The presence of the mask 20 causes the material exiting from the head 18 to be deposited on the layer 14 only through the groove 22. The sprayed material penetrates into the groove 22 and adheres to the insulating layer 14 applied during the previous spraying step. The pattern for the strip 24 is therefore the same as that of the groove 22 of the mask 20, and will be designed in such a way as to generate the needed heat flow toward the core of the body, and thus the temperature required to maintain the polymeric material flowing in the hot channel in the molten state.

It should be noted that, the mask may be replaced by a robotised system equipped with a torch able to produce a focused beam.

The electrically conducting material applied by means of the head 18 is selected among the metals that exhibit a high temperature coefficient of resistance such as Ni, Cu, Fe—Ni or equivalents. The thickness of the conducting layer 24 can be in the range from 30 to 100 micron, according to the required resistance value for the heater and the electrical power to be dissipated for the heating process.

On the connections to the electrical power supply the thickness of the strip has to be properly defined and usually increased.

Having sprayed the electrically conducting material, the mask 20 is removed.

5) A second layer of insulating material 26 is added on the body 10, as schematically shown in FIG. 3. The second layer of insulating material 26 coats the conductive strip 24 and the first layer of insulating material 14. The second layer of insulating material 26 is applied by spraying and imparting the same rotation and translation movements used for the deposition of the previous layers or otherwise according to the most advantageous production process.

This second layer of insulating material can have the same electrical characteristics and composition as the first layer 14, i.e. it can be constituted by a layer about 70 to 100 micron thick, obtained by thermal spray of, for example, the powder marketed with the code Metco 105SF which essentially consists of $Al_2O_3$ or of other materials having high dielectric strength, low electrical conductivity. The function of the second layer of insulating material 26 is to guarantee compliance with electrical safety standards for injection moulding installations. Another requirement for this layer on the body, it is the layer facing the environment, is to exhibit low emissivity for the infrared radiation.

The spraying equipment can be, for example, of the type provided by the Swiss company Sulzer Metco AG.

Figure 7:
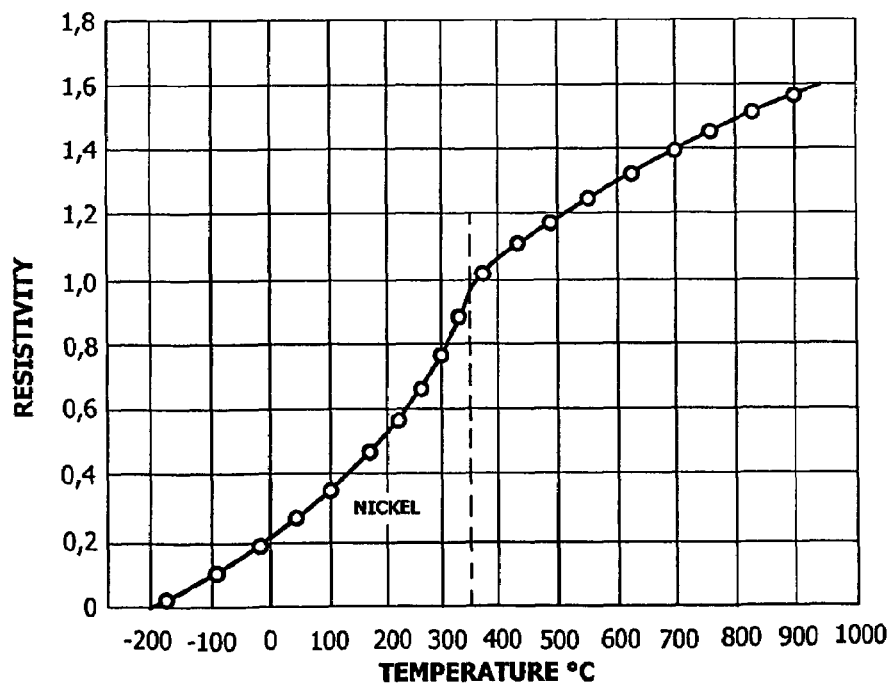
FIG. 7 is a the resistance to temperature diagram related to pure Nickel

At the end of the sequence of deposition steps, the body 10 has a strip 24 of electrically conducting material incorporated between two layers 14, 26 of insulating material, strongly attached on the body 10 and thermally coupled very well with the body to be heated; this arrangement, together with the reduction in mass and external surface area, results in heat transfer so fast and efficient to offer a decrease in time and power consumption of about 50%. The strip 24 forms a heating electrical resistor which can be electrically powered to heat the body 10 and the injection material which in use flows inside the channel 12. The high temperature coefficient of resistance exhibited by the material selected for the strip 24 enables the measurement of the temperature of the body 10 because of the known calibrated function that relates its resistance and temperature, such as shown in the diagram FIG. 7 in connection with pure Nickel.

Therefore the heating element 24 can be advantageously used for the control of the system, removing the need of controlling thermocouples. The same resistive strip cal also be used for strain monitoring. Hence there is no need for other electrical connections but those for the heater, with consequent lower cost for materials, man power and improved reliability of the system.

Alternatively, the method according to the present invention allows to insert, with the same methodology described above, any controlling thermocouple which may be necessary. The use of NiCr-based resistors for the heater does not excludes that the thermocouples may be eliminated, as explained above, by means of a further resistive strip sprayed with materials which allow automatically to regulate its temperature thanks to the change of their resistivity.

6) If the insulating layer 26 does not fulfil the requirement of low thermal emissivity, a further coat will be deposited on it, with any adequate means, e.g. thermal spray or evaporation or painting, brushing and the like. This layer with low emissivity greatly reduces the radiative heat transfer and then reduces the electrical power losses during the operation at the high temperatures envisaged for the body.

Similarly, if the insulating layers 24, 26 exhibit too large porosity, in order to avoid penetration of water, oil, durst, ect, an intermediate or final layer has to exhibit low emissivity.

A practical example of the method according to the invention, which also provides for the application of further insulating/sealing layers, shall now be described in greater detail below.

1. Selecting the metal alloy of the support with controlled thermal expansion coefficient (such as to match with or equivalent to the expansion coefficient of the materials of the layers on top of the substrate), for example Kovar or Vacovit series or AISI 446 or the like.

2a. Conditioning the surface of the body by means of various process as explained before and a final sand blasting and/or oxidation process.

2b. Applying by may means of a Thermal spray techniques a controlled-thickness of bond coat consisting of NiCr or NiAl, or CoNi or Ni or the like, adapted to mutually match therebetween the thermal expansion coefficients of the metal alloy substrate and the after-sprayed dielectric coating ($1^{st}$ layer) as much as possible.

3. Coating with a dielectric material at controlled thickness ($1^{st}$ layer), e.g. $Al_2O_3$ or $ZrO_2$ for example by means of Thermal Spray techniques.

4. Coating with sealant with controlled thickness ($2^{nd}$ layer), e.g. glass with a thermal expansion coefficient matched to that of the conditioned body (e.g. 7052 Corning Glass).

5. Treating the sealant, if necessary, for instance by re-melting the glass layer in a furnace to close any porosity of the underlying dielectric layer.

6. Applying the conducting material with high temperature coefficient of resistance, as stated for the purpose of regulating the temperature, improving system reliability. The conductor material, e.g. Cu, Ni, Fe—Ni is deposited by means of Thermal Spray.

7. Covering with a dielectric characterised by low thermal emissivity, high dielectric strength and low electrical conductivity ($4^{th}$ layer), e.g. ceramic or glass or enamels applied by Thermal Spray to optimise the electrical efficiency and assure enhanced electric safety.

8. Covering with antismog sealant (to insulate from oil and humidity) and with low emissivity able to withstand up to 500° C., if the $4^{th}$ layer is porous.

The method according to the invention may be applied directly on the components of the injection system (e.g.: nozzles and/or hot runners manifolds), and on accessories (coils, plates) to be applied to the previous ones in superficial contact, thereby assuring operations with temperatures of up to about 500° C. In other words, the method can be used to form one or more heating resistors on the surface of any component for injection moulding apparatuses and for heating equipment in general. Of course, if the surface whereon the heating resistor is to be obtained is planar, it is not necessary to impart the rotary motion to the body during the spraying step.

Figure 5:
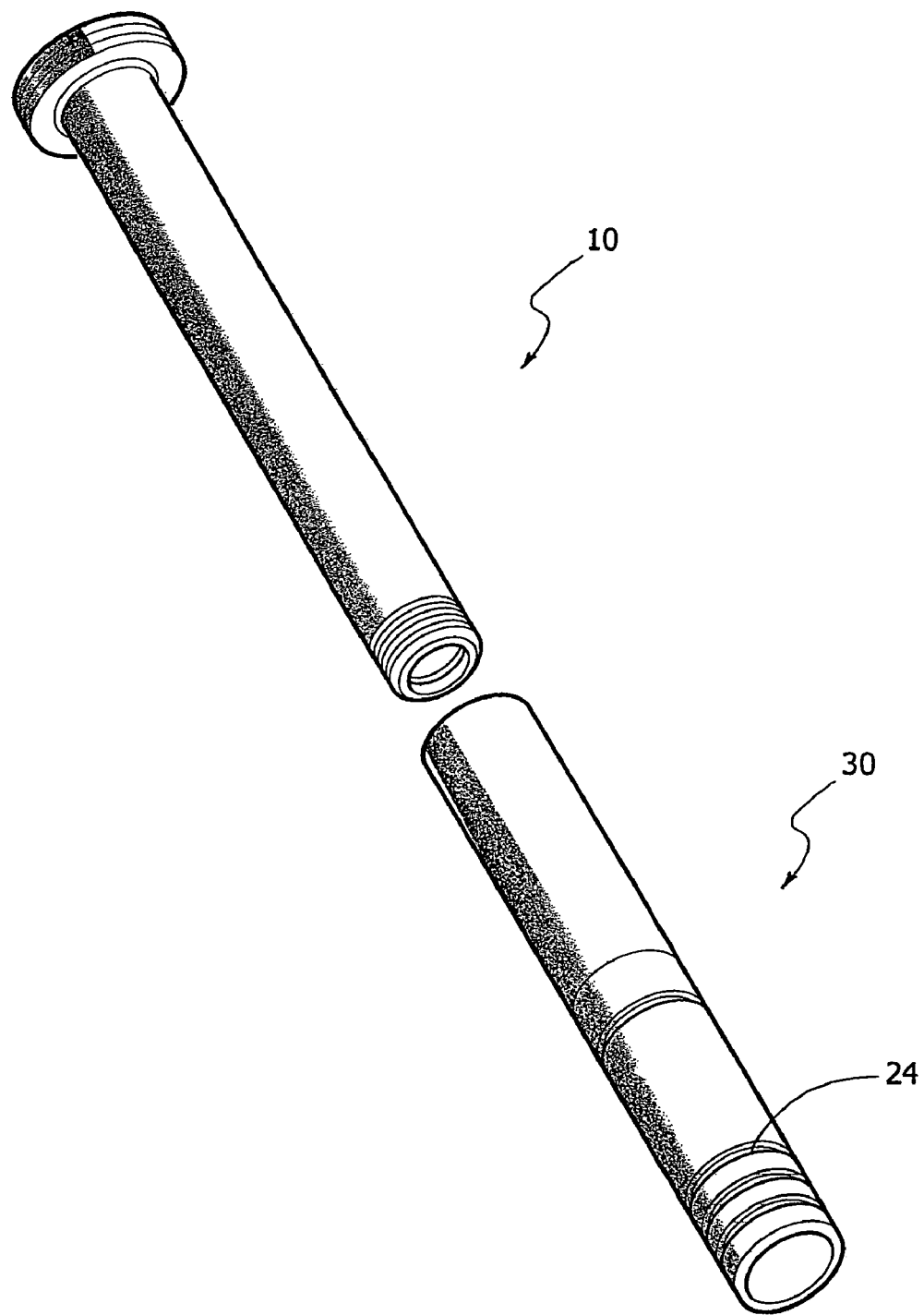
FIG. 5 shows another application of the method according to the invention.

In a particular application of the method according to the invention to an injector of cylindrical or conical shape, a component with complementary shape (coil) can be applied, whereon is added a resistive strip sprayed in the manners described above. This embodiment is illustrated in FIG. 5, with reference to a cylindrical conformation of injector 10 and coil 30 with the strip 24. In the case of conical conformation, the conicity of the coupling is advantageous to obtain an optimal contact between the surfaces of the injector 10 and coil 30 and hence an effective transmission of heat.

As stated, the method according to the invention can also be used to form, by spraying, thermocouples to control the heating resistors, when necessary. However, this does not exclude that the thermocouples may be eliminated, as explained above, by means of the resistive strip sprayed with materials which allow automatically to regulate its temperature thanks to the variation of their resistivity.

Moreover, the method according to the invention can also be used to form, by spraying, contacts for electrically connecting the or each resistor of the component.

To summarise, the innovation at the basis of the present invention consists of the obtainment of installations with hot channels for the injection moulding of plastic materials operating at temperatures of up to 500° C. by spraying techniques, characterised by the selection of the support metal, of the most suitable spraying technology and appropriate support technologies with respect to the obtainment of solid electrical connections, compact insulating layers, heating resistive layers in direct contact with the metal with a high temperature coefficient of resistance, also in order to avoid the use of thermocouples with consequent increase in reliability and simplification of the wiring, and of outer layers with low thermal emissivity to reduce consumption and assure compliance with safety standards together with a protection of the system against smog, humidity, water, oil etc.

Moreover, use of layers that are insulating and impermeable to the environment (over the heating layers) with low emissivity improves electrical consumption efficiency.

Thus, the main advantages of the invention are those listed below:

1. The coupling between metallic support and insulating layers and conducting strips sprayed (with Thermal Spray and similar technologies) based on matched thermal expansion coefficients, prevents dangerous flaws in the layers and hence assures an optimal operation.

2. Possibility of continuous operation of the system up to 500° C. and in any case for any temperature required by the plastic materials to be moulded.

3. Possible elimination of control thermocouples thanks to the use for the resistive strips of materials with high temperature coefficient of resistivity, in such a way as to control temperature directly with an Ohmic measurement carried out on the resistive strip itself by means of an appropriate regulating unit.

4. Improvement of the electrical efficiency in terms of reduced power consumption.

5. Predisposition for reliable contacts and electrical connections.

6. Capability of easily providing disposable resistors, i.e. on tubular bodies designed to be fitted over injection nozzles and the like.

7. Reduction the manufacturing costs.

8. The decrease in power consumption and increase in speed of heating are so notable that it becomes possible and suitable the use of low voltage power supply (24 to 48 V), and consequently many technical problems vanish with further reduction of costs and advantages in terms of reliability.

Lastly, it should be recalled that the heating system thus conceived may be used either directly on nozzles and manifolds of hot runners and other subsystems, or on accessories and auxiliary elements to be applied on the aforesaid elements by means of superficial contact.

Naturally, without altering the principles of the invention, the construction components and the embodiments may be widely varied from what is described and illustrated herein without thereby departing from the scope of the invention as defined by the claims that follow.

Thus, as pointed out at the beginning of the specification, electrical heating resistors provided for according to the invention include resistive elements designed to produce heat both resistively (i.e. traditionally operating on the Joule effect) and inductively. In the latter case the sprayed strip of material of the electrically conducting sprayed strip 24 shall preferably consist of a highly conductive material such as Ni and/or Ag or Cu.

What is claimed is:

1. Method for producing components for apparatus for injection moulding of plastic materials comprising:
providing a body of thermally conducting material provided with a passage for the plastic material to be injected,
applying at least one base layer of electrically insulating and thermally conductive material on the body at controlled values of temperature and pressure
applying at least one heating electrical resistor on said base layer,
making said body of thermally conducting material with a metal alloy having an expansion coefficient that matches that of said base layer,
applying a bond layer on said body,
applying said base layer on said bond layer on said body
spraying on said base layer a layer of electrically conducting material in such a way as to apply on said body at least one strip of said electrically conducting material, said strip defining said at least one heating electrical resistor and said electrically conducting material being provided with a high temperature coefficient of resistance.

2. Method as claimed in claim 1, wherein the applying said base layer on the body is performed by Thermal Spray techniques.

3. Method as claimed in claim 2, in which the spraying on said base layer to apply the at least one strip defining the resistor is operated by Thermal Spray techniques, wherein the spraying comprises the step of applying on the body a mask provided with at least one through groove which extends according to a predetermined path and in which said electrically conducting material is sprayed, and in that said mask is then removed to leave on the body said strip of electrically conducting material forming said heating electrical resistor.

4. Method as claimed in claim 3, further comprising pre-heating said base layer and applying a layer of sealing material thereon before applying said mask on the body.

5. Method as claimed in claim 3, further comprising applying on the body a second layer of electrically insulating material after the removal of said mask.

6. Method as claimed in claim 5, wherein the applying said second layer of electrically insulating material on the body is carried out by Thermal Spray techniques.

7. Method as claimed in claim 6, wherein the second electrically insulating layer is made of a dielectric material with low thermal emissivity.

8. Method as claimed in claim 7, further comprising applying a sealing coating with high dielectric strength, low conductivity and low thermal emissivity.

9. Method as claimed in claim 6, further comprising the deposition of a layer with low thermal emissivity when the second layer has not an adequate emissivity value.

10. Method as claimed in claim 1, wherein said metal alloy is selected in the class of Kovar alloys, Vacovit alloys, and AISI 446 steel.

11. Method as claimed in claim 1, wherein the electrically insulating and thermally conductive material of said base layer is alumina or zirconia.

12. Method as claimed in claim 1, wherein the electrically conducting material with high temperature coefficient of resistance of said strip is selected among Ni, Cu, Fe-Ni, NiCr.

13. Method as claimed in claim 1, wherein the body comprises auxiliary elements subsequently applied in superficial contact on said components for apparatus for the injection moulding of plastic materials.

14. Method as claimed in claim 1, wherein said at least one strip, of an electrically conducting material with high temperature coefficient of resistance allows a self-regulation of the heating temperature and the consequent possible suppression of control thermocouples.

15. Method as claimed in claim 1, further comprising deposition by spraying of at least one control thermocouple or at least one strip.

16. Method as claimed in claim 1, further comprising the deposition of an antismog layer which has low emissivity and the ability to protect the lower layers against humidity, oil and other contaminants.

17. Method as claimed in claim 1, wherein said bond-coat layer adjusts the mutual matching therebetween the thermal expansion coefficients of said metal alloy of said body and of said base layer.

18. Method as claimed in claim 1, wherein the applying said bond layer on said body is performed by a Thermal Spray technique.

19. Method as claimed in claim 1, wherein said bond layer consists of one among Ni, NiCr, NiAl, CoNi, CoNiCr, CoMoCr, NiCrAlY.

20. Method as claimed in claim 1, further comprising conditioning of the surface of said body by treatments selected among mechanical, chemical and thermal treatments followed by at least one of sand blasting and oxidation before the spraying of the bond layer.

* * * * *